(12) United States Patent
Russell et al.

US009066067B2

(10) Patent No.: US 9,066,067 B2
(45) Date of Patent: *Jun. 23, 2015

(54) METHOD AND SYSTEM OF DIAGNOSING A VIDEO CONDITION EXPERIENCED AT A CUSTOMER PREMISES

(71) Applicant: AT&T Intellectual Property I, LP, Atlanta, GA (US)

(72) Inventors: Sam Russell, Tinton Falls, NJ (US); Paritosh Bajpay, Edison, NJ (US); David H. Lu, Morganville, NJ (US); Shiu Y. Chong, Fair Haven, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/277,177

(22) Filed: May 14, 2014

(65) Prior Publication Data

US 2014/0241170 A1 Aug. 28, 2014

Related U.S. Application Data

(63) Continuation of application No. 13/949,717, filed on Jul. 24, 2013, now Pat. No. 8,761,030, which is a continuation of application No. 13/024,055, filed on Feb. 9, 2011, now Pat. No. 8,520,532, which is a continuation of application No. 11/970,934, filed on Jan. 8, 2008, now Pat. No. 7,908,632.

(51) Int. Cl.
*G01R 31/317* (2006.01)
*H04H 20/28* (2008.01)
(Continued)

(52) U.S. Cl.
CPC ............. *H04N 17/00* (2013.01); *H04N 17/004* (2013.01); *H04N 21/2404* (2013.01); *H04N 21/4425* (2013.01)

(58) Field of Classification Search
CPC . H04N 17/00; H04N 17/004; H04N 21/2402; H04N 21/2404; H04N 21/4425; H04N 21/44209; H04N 21/44218; H04N 21/6473; H04N 21/64723; H04N 21/64738; H04N 1/32
USPC .................. 370/229–238, 241–253, 484–497; 725/38, 91–96, 98, 106–107, 116, 135, 725/143–153
See application file for complete search history.

(56) References Cited

U.S. PATENT DOCUMENTS 6,104,908 A 8/2000 Schaffner et al.
6,205,143 B1 3/2001 Lemieux
(Continued)

OTHER PUBLICATIONS

"Spirent SmartSight: Automated Testing and Diagnostics for Triple Play Service Assurance, Spirrent Communications, Inc.", 2003.

*Primary Examiner* — Tri H Phan
(74) *Attorney, Agent, or Firm* — Guntin & Gust, PLC; Douglas Schnabel

(57) ABSTRACT

A test controller can be operable to diagnose a video condition experienced at a customer premises. The test controller can include a port coupled to the customer premises. The test controller can also include a processor operable to activate a diagnosis sequence, send a set of questions to equipment at the customer premises, and isolate a cause of the video condition to a portion of the network, in response to receiving test a video access device can include a first port coupled to particular test equipment and a second port coupled to video access devices. The test controller can be part of a system that includes methods used to diagnose the video condition experienced at the customer premises.

20 Claims, 6 Drawing Sheets

(51) Int. Cl.
  *H04N 7/173*     (2011.01)
  *H04N 17/00*    (2006.01)
  *H04N 21/24*    (2011.01)
  *H04N 21/4425*  (2011.01)

(56) References Cited

U.S. PATENT DOCUMENTS

| | | | |
|---|---|---|---|
| 6,411,623 B1 | 6/2002 | DeGollado et al. | |
| 6,414,960 B1 | 7/2002 | Kuhn et al. | |
| 6,816,904 B1 * | 11/2004 | Ludwig et al. | 709/226 |
| 7,085,238 B2 | 8/2006 | McBeath | |
| 7,181,360 B1 | 2/2007 | Nikolac et al. | |
| 7,212,496 B1 | 5/2007 | Chong | |
| 7,239,698 B2 | 7/2007 | Phillips et al. | |
| 7,245,701 B2 | 7/2007 | Tennyson et al. | |
| 7,274,684 B2 | 9/2007 | Young et al. | |
| 7,483,379 B2 | 1/2009 | Kan et al. | |
| 7,555,000 B2 | 6/2009 | Shimoji et al. | |
| 7,617,516 B2 | 11/2009 | Huslak et al. | |
| 7,908,632 B2 * | 3/2011 | Russell et al. | 725/107 |
| 7,929,599 B2 | 4/2011 | Ganesh et al. | |
| 8,339,968 B2 | 12/2012 | Howe et al. | |
| 8,352,994 B2 * | 1/2013 | Pham et al. | 725/107 |
| 8,402,025 B2 | 3/2013 | Taylor et al. | |
| 8,424,049 B2 | 4/2013 | Skelly | |
| 8,484,515 B2 | 7/2013 | Adams | |
| 8,520,532 B2 * | 8/2013 | Russell et al. | 370/242 |
| 8,761,030 B2 * | 6/2014 | Russell et al. | 370/242 |
| 8,849,908 B2 * | 9/2014 | Stanzione et al. | 709/204 |
| 2003/0028891 A1 | 2/2003 | Hardt et al. | |
| 2003/0145075 A1 | 7/2003 | Weaver et al. | |
| 2003/0182666 A1 | 9/2003 | You | |
| 2005/0144632 A1 | 6/2005 | Mears | |
| 2005/0163052 A1 | 7/2005 | Savage et al. | |
| 2005/0232153 A1 | 10/2005 | Bishop et al. | |
| 2006/0067237 A1 | 3/2006 | Burns | |
| 2006/0218600 A1 | 9/2006 | Johnson | |
| 2006/0269162 A1 | 11/2006 | Chen et al. | |
| 2007/0058043 A1 | 3/2007 | Thukral | |
| 2007/0121792 A1 | 5/2007 | Chong | |
| 2007/0162932 A1 | 7/2007 | Mickle | |
| 2007/0282401 A1 | 12/2007 | Kahn et al. | |
| 2007/0283400 A1 | 12/2007 | Lee | |
| 2008/0066113 A1 | 3/2008 | Skelly | |
| 2008/0192119 A1 | 8/2008 | Li et al. | |
| 2008/0288977 A1 | 11/2008 | Howcroft et al. | |
| 2009/0034411 A1 * | 2/2009 | Bernard | 370/221 |
| 2009/0064248 A1 | 3/2009 | Kwan et al. | |
| 2009/0178075 A1 | 7/2009 | Russell et al. | |
| 2012/0050546 A1 * | 3/2012 | Pham | 348/192 |

* cited by examiner

US 9,066,067 B2

METHOD AND SYSTEM OF DIAGNOSING A VIDEO CONDITION EXPERIENCED AT A CUSTOMER PREMISES

CROSS REFERENCE TO RELATED APPLICATIONS

This application is a continuation of U.S. patent application Ser. No. 13/949,717, filed Jul. 24, 2014, which is a continuation of U.S. patent application Ser. No. 13/024,055 filed Feb. 9, 2011, now U.S. Pat. No. 8,520,532 which is a continuation of U.S. patent application Ser. No. 11/970,934 filed Jan. 8, 2008, now U.S. Pat. No. 7,908,632, the disclosures of all of which are incorporated herein by reference in their entirety.

FIELD OF THE DISCLOSURE

The present disclosure relates to methods and systems of diagnosing video conditions experienced at one or more customer premises.

BACKGROUND

Delivery of services provided to customers of a network is becoming more competitive as the number of service offerings increases. Many service providers provide telephone services, Internet access, video services, other appropriate services, or any combination thereof to customers. These services may be provided to the customer's premises via a packet-switched network.

A customer of the service provider may be able to detect quality of experience issues at the customer premises before any alarms or alerts are detected within the service provider's work center or other offices. The information provided by the customer may be in the customer's own words which may be difficult for the service provider to use because the information may not be in a format that is useful to the service provider. Also, the service provider may need to dispatch a technician to address the quality of experience issues at the customer premises. When a technician is dispatched, the service provider incurs significant costs related travel time to and from the remote location where a particular video access device is located. The various issues with understanding quality of experience issues as described by a customer and dispatching technicians can significantly impact a service provider's ability to provide the highest quality service to the customer and to address quality of experience issues much faster. Such issues can result in loss of existing customers due to problems taking significant time to address, increased costs to the service provider, or the like.

BRIEF DESCRIPTION OF THE DRAWINGS

Skilled artisans will appreciate that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, understand that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
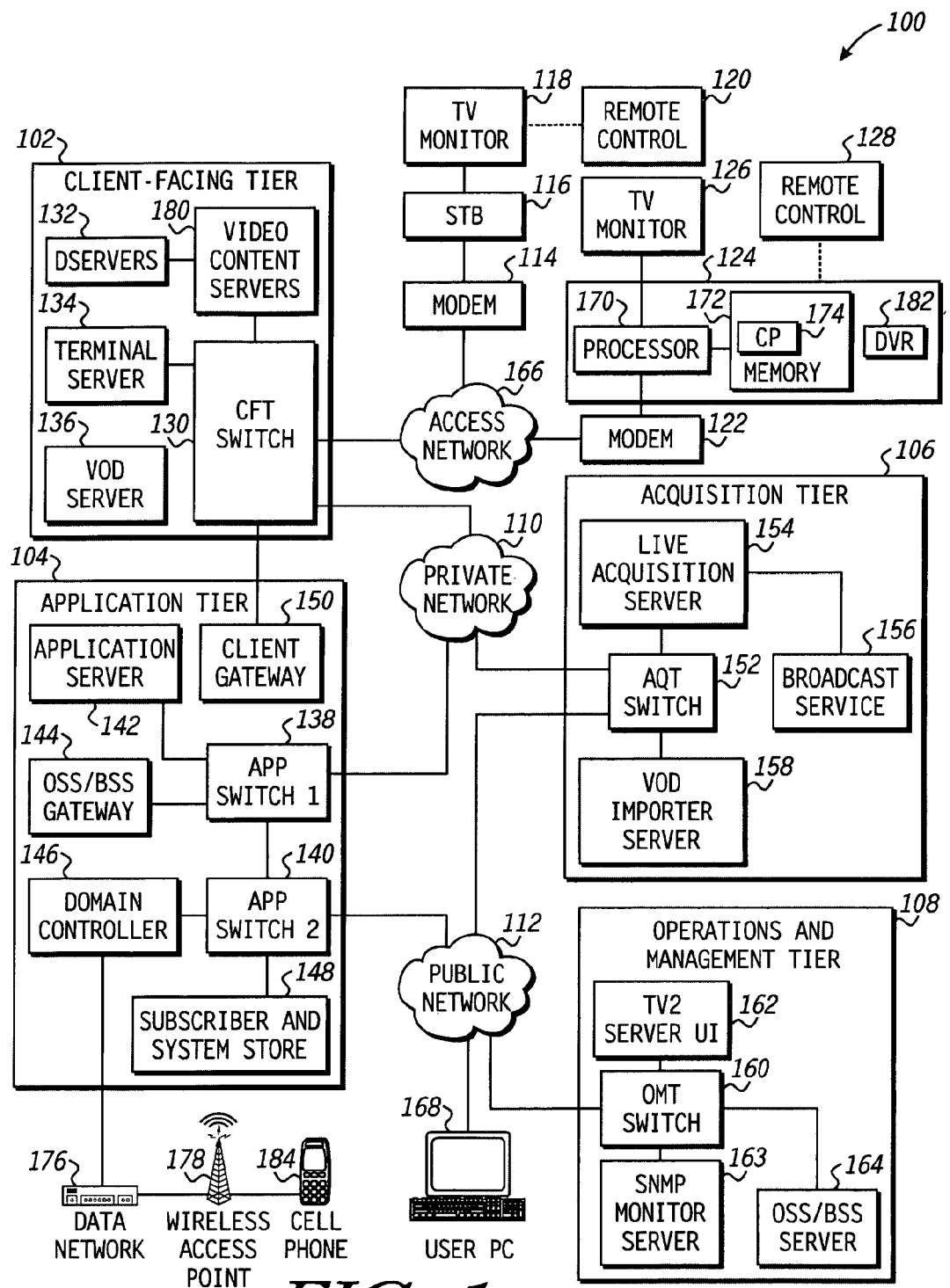
FIG. 1 includes a block diagram illustrating an embodiment of an Internet protocol television system.

FIG. 1 includes an illustration of an Internet protocol television ("IPTV") system 100 including a client facing tier 102, an application tier 104, an acquisition tier 106, and an operations and management tier 108. Each tier 102, 104, 106, and 108 is coupled to one or both of a private network 110 and a public network 112. For example, the client facing tier 102 can be coupled to the private network 110, while the application tier 104 can be coupled to the private network 110 and to a public network, such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an IPTV network. In an illustrative embodiment, modems, such as a first modem 114 and a second modem 122, can be coupled to the private access network 166. The client-facing tier 102 can communicate with a first representative set-top box ("STB") device 116 via the first modem 114 and with a second representative STB device 124 via the second modem 122. The client-facing tier 102 can communicate with a large number of STBs over a wide geographic area, such as a regional area, a metropolitan area, a viewing area, or any other suitable geographic area that can be supported by networking the client-facing tier 102 to numerous STB devices. In one embodiment, the client-facing tier 102 can be coupled to the modems 114 and 122 via fiber optic cables. Alternatively, the modems 114 and 122 can be digital subscriber line ("DSL") modems that are coupled to one or more network nodes via twisted pairs, and the client-facing tier 102 can be coupled to the network nodes via fiber-optic cables. Each STB device 116 and 124 can process data received from the private access network 166 via an IPTV software platform, such as Microsoft® TV IPTV Edition.

The first STB device 116 can be coupled to a first display device 118, such as a first television monitor, and the second STB device 124 can be coupled to a second display device 126, such as a second television monitor. Moreover, the first STB device 116 can communicate with a first remote control 120, and the second STB device can communicate with a second remote control 128. In an exemplary, non-limiting embodiment, each STB device 116 and 124 can receive data or video from the client-facing tier 102 via the private access network 166 and render or display the data or video at the display device 118 or 126 to which it is coupled. The STB devices 116 and 124 thus may include tuners that receive and decode television programming information for transmission to the display devices 118 and 126. Further, the STB devices 116 and 124 can include an STB processor 170 and an STB memory device 172 that is accessible to the STB processor. In a particular embodiment, the STB devices 116 and 124 can also communicate commands received from the remote controls 120 and 128 back to the client-facing tier 102 via the private access network 166.

In an illustrative embodiment, the client-facing tier 102 can include a client-facing tier ("CFT") switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand ("VOD") content. The CFT switch 130 can also be coupled to a terminal server 134 that provides terminal devices, such as a game application server and other devices with a common connection point to the private network 110. In a particular embodiment, the CFT switch 130 can also be coupled to a VOD server 136.

The application tier 104 can communicate with both the private network 110 and the public network 112. In this embodiment, the application tier 104 can include a first application tier ("APP") switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the STB devices 116 and 124 via the private access network 166, so the STB devices 116 and 124 can provide functions, such as display, messaging, processing of IPTV data and VOD material. In a particular embodiment, the OSS/BSS gateway 144 includes operation systems and support ("OSS") data, as well as billing systems and support ("BSS") data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the eFT switch 130. The client gateway 150 can provide user access to the private network 110 and the tiers coupled thereto.

In a particular embodiment, the STB devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen STB devices, from accessing the private network 110, by denying access to these devices beyond the private access network 166.

For example, when the STB device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the STB device 116 access to IPTV content and VOD content. If the client gateway 150 cannot verify subscriber information for the STB device 116, such as because it is connected to a different twisted pair, the client gateway 150 can deny transmissions to and from the STB device 116 beyond the private access network 166.

The acquisition tier 106 includes an acquisition tier ("AQT") switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch 152 can be coupled to a VOD importer server 158 that stores television content received at the acquisition tier 106 and communicate the stored content to the client-facing tier 102 via the private network 110.

The operations and management tier 108 can include an operations and management tier ("OMT") switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol ("SNMP") monitor 163 that monitors network devices. In a particular embodiment, the OMT switch 160 can communicate with the AQT switch 152 via the public network 112.

In a particular embodiment, during operation of the IPTV system, the live acquisition server 154 can acquire television content from the broadcast service 156. The live acquisition server 154 in turn can transmit the television content to the AQT switch 152, and the AQT switch 152 can transmit the television content to the CFT switch 130 via the private network 110. Further, the television content can be encoded at the D-servers 132, and the CFT switch 130 can communicate the television content to the modems 114 and 122 via the private access network 166. The STB devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the STB device 116 or 124, the request can be transmitted over the private access network 166 to the VOD server 136 via the CFT switch 130. Upon receiving such a request, the VOD server 136 can retrieve requested VOD content and transmit the content to the STB device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer ("PC") 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices, such as a cellular telephone 180.

In a particular embodiment, the STB devices can include an STB computer program 174 that is embedded within the STB memory device 172. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second STB device 124. For instance, in an illustrative embodiment, the account information can relate the user's account to the second STB device 124 by associating the user account with an IP address of the second STB device 124, with data relating to one or more twisted pairs connected with the second STB device 124, with data related to one or more fiber optic cables connected with the second STB device 124, with an alphanumeric identifier of the second STB device 124, with any other data that is suitable for associating second STB device 124 with a user account, or with any combination of these.

Figure 2:
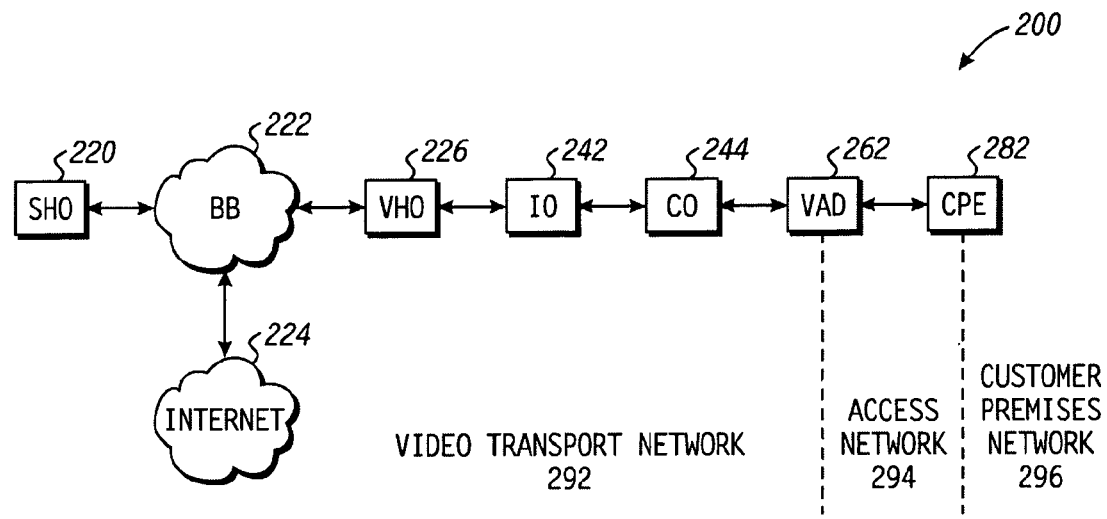
FIG. 2 includes a block diagram illustrating some of the connections between the customer premises and other portions of a network that supports the Internet protocol television system.

FIG. 2 includes an illustration of a portion of an exemplary network 200 that can be used to deliver digital content, such as IPTV using the IPTV system 100 in FIG. 1, to a customer. The network can include a super hub office ("SHO") 220 that is bidirectionally coupled to an Internet protocol backbone ("BB") 222 that is bidirectionally coupled to each of the Internet 224 and a video hub office ("VHO") 226. In one embodiment, streaming video content provided from national broadcasting networks (e.g., ABC™, CBS™, CNN™, HBO™, etc.) can be sent to and received by the SHO 220. Streaming video content from local broadcasting networks can be sent to and received by the VHO 226. VOD content can be received by and stored within the VHO 226. Internet access can be established via the BB 222 to the Internet 224. Such Internet access can be useful for obtaining files, making calls, requesting other content, or any combination thereof by a customer at the customer premises.

Continuing with the network 200, an intermediate office ("IO") 242 is by directionally coupled to the VHO 226 and a central office ("CO") 244. The CO 244 is bidirectionally coupled to a video access device ("V AD") 262. The V AD 262 can be a digital subscriber line access multiplexer, a video ready access device, or the like. The video access ready device is similar to the digital subscriber line access multiplexer but the video access ready device is particularly designed for streaming broadcast video for IPTV. The VAD 262 is bidirectionally coupled to customer premises equipment ("CPE") 282.

Portions of the network 200 can be broken down into smaller networks for purposes of maintaining the network 200. For example, the portion of network 200 that is upstream of the V AD 262 can be referred to as the video transport network, the portion of the network 200 from the V AD 262 to the customer premises can be referred to as the access network, and the portion of the network 200 within the customer premises can be referred to as the customer premises network.

After reading this specification, skilled artisans will appreciate that many different network configurations are possible. For example, VOD content may be accessed by a customer via the Internet 224 or the SHO 220, instead of the VHO 226. No intermediate office or a plurality of intermediate offices similar to the IO 242 may be used. More than one SHO or VHO may also be used. Thus, the particular implementation of a network used to provide services to a customer is variable and can be tailored to the needs or desires of a network operator. Therefore, the network 200 in FIG. 2 is merely for purposes of illustration and is not to be construed as limiting the scope of the present invention.

Figure 3:
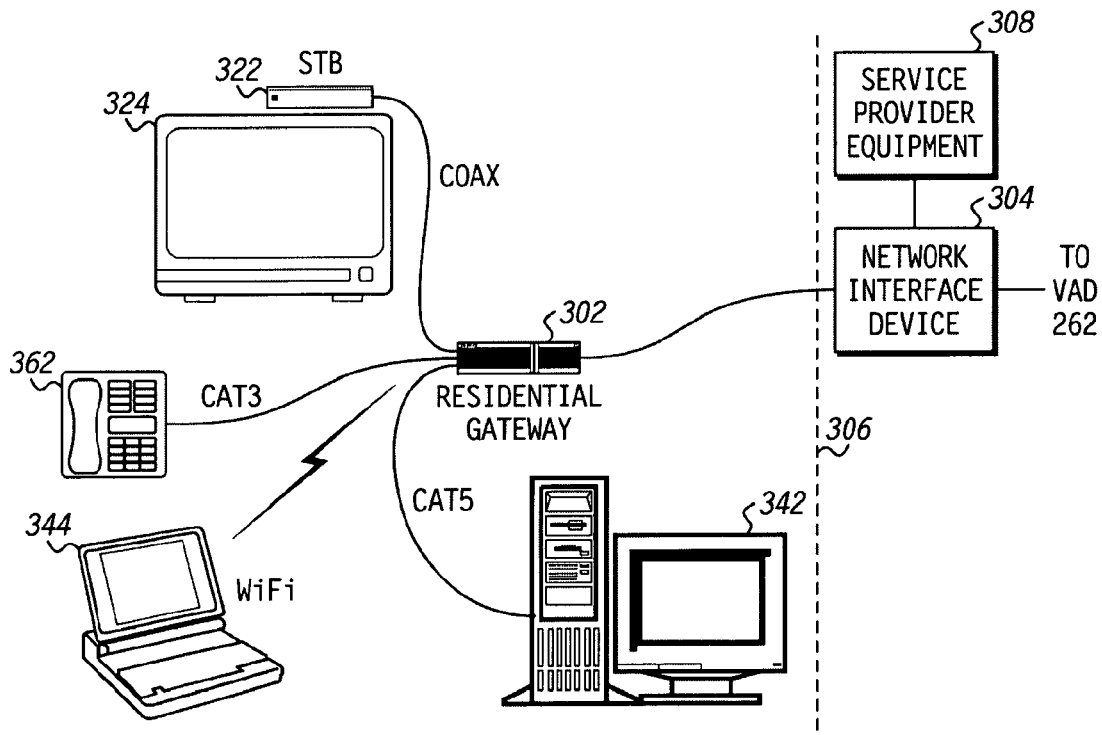
FIG. 3 includes an illustration of equipment that can be used at a customer premises.

FIG. 3 includes an illustration of exemplary customer premises equipment that can be used at the customer premises. Within the customer premises, a signal can be from the VAD 262 received at a network interface device ("NID") 304. The NID 304 is typically located outside of a building at the customer premises (to the right of the dashed line 306 in FIG. 3). The residential gateway ("RG") 302 and other equipment at the customer premises to the left of the dashed line can be located within one or more buildings at the customer premises.

The NID 304 can allow the signal to pass to the RG 302, which in turn can route the signal to a particular device or other equipment within the customer premises. The RG 302 may include a variety of connections to allow different devices, different communication media, or any combination thereof to be used. For example, the RG 302 may be configured to work with a coaxial cable, a Category Five cable, a Category Three cable, a wireless transceiver, another suitable medium for transporting a signal, or any combination thereof. The RG 302 can be bidirectionally coupled to a STB 322 that can be coupled to a monitor 324, such as a television. The RG 302 can be by directionally coupled to a desktop computer 342 via a wireline connection, to a portable device 344 (e.g., a laptop computer, a personal digital assistant, a cellular phone, or another device that includes a processor), or any combination thereof. The RG 302 can be bidirectionally coupled to a telephone 362 via a wireline connection. In another embodiment, more or fewer devices, another type of device, or any combination thereof may be located at the customer premises and may be coupled to the RG 302.

The NID 304 can include terminals that allow service provider equipment 308 to be coupled to the V AD 262, the RG 302, or both. The service provider equipment 308 can include test equipment or may include other equipment to replicate a function of a device within the building (to the left of the dashed line 306 in FIG. 3) at the customer premises.

Figure 4:
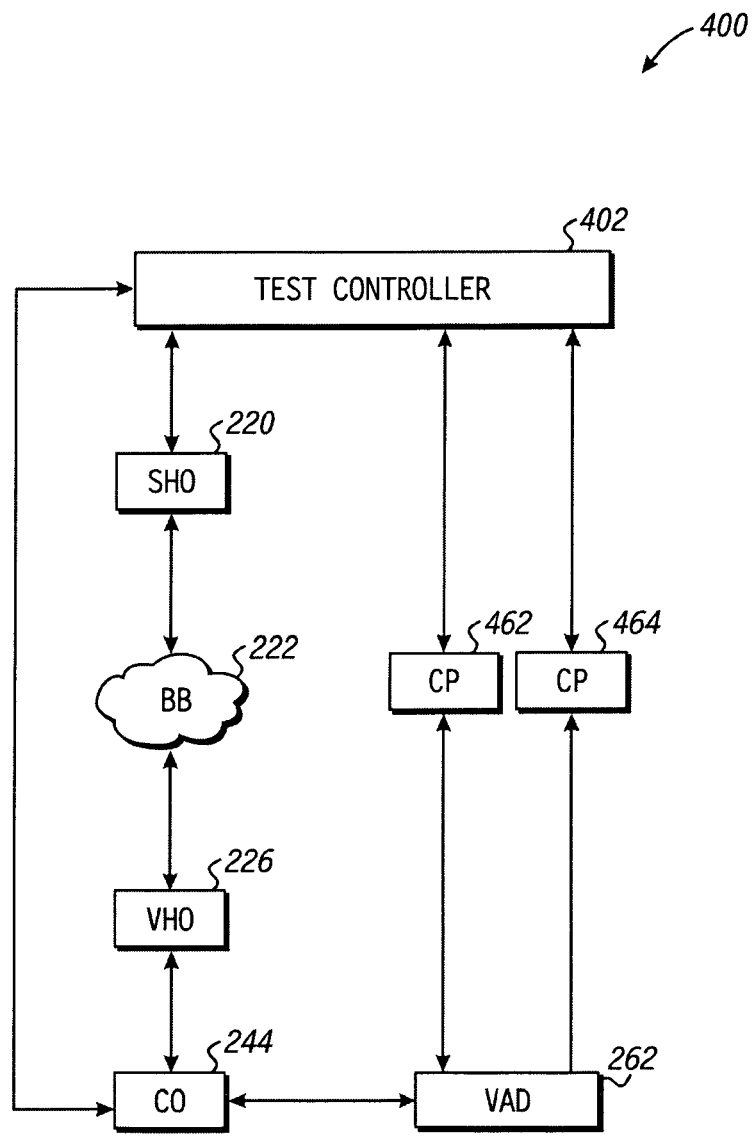
FIG. 4 includes a block diagram illustrating a system operable to diagnose a video condition at the customer premises.

FIG. 4 includes a functional block diagram of an architecture for a system 400 that can be used to diagnose a video condition at a customer premises. In a particular embodiment, for a video content can be transmitted as a packetized video broadcast stream. The system 400 includes a test controller 302 that is bidirectionally coupled to the SHO 220 and equipment at two different customer premises ("CP"), namely CP 462 and CP 464. The test controller 402 can be coupled to equipment at other CPs that are not illustrated. The coupling can include communicatively coupled, and therefore, the coupling can include direct or indirect connections or a variety of paths. After reading this specification, skilled artisans will appreciate that the system can be tailored to the particular needs or desires of a service provider.

As will be described in more detail, the test controller 402 can command a set of questions to be transmitted to CP 462 and CP 464, another CP, or any combination of CPs. In an embodiment, the transmission path could start at the SHO 220. The set of questions can be transmitted over a video transmission channel (e.g., a broadcast channel) or using a different transmission medium (e.g., over the Internet or as a phone call).

Attention is now directed to an exemplary, non-limiting method of using a system described herein to diagnose a video condition experienced at a customer premises. The method will be described in reference to FIGS. 2 to 4. After reading this specification, skilled artisans will appreciate that many different methods can be used and not depart from the concepts described herein.

Figure 5:
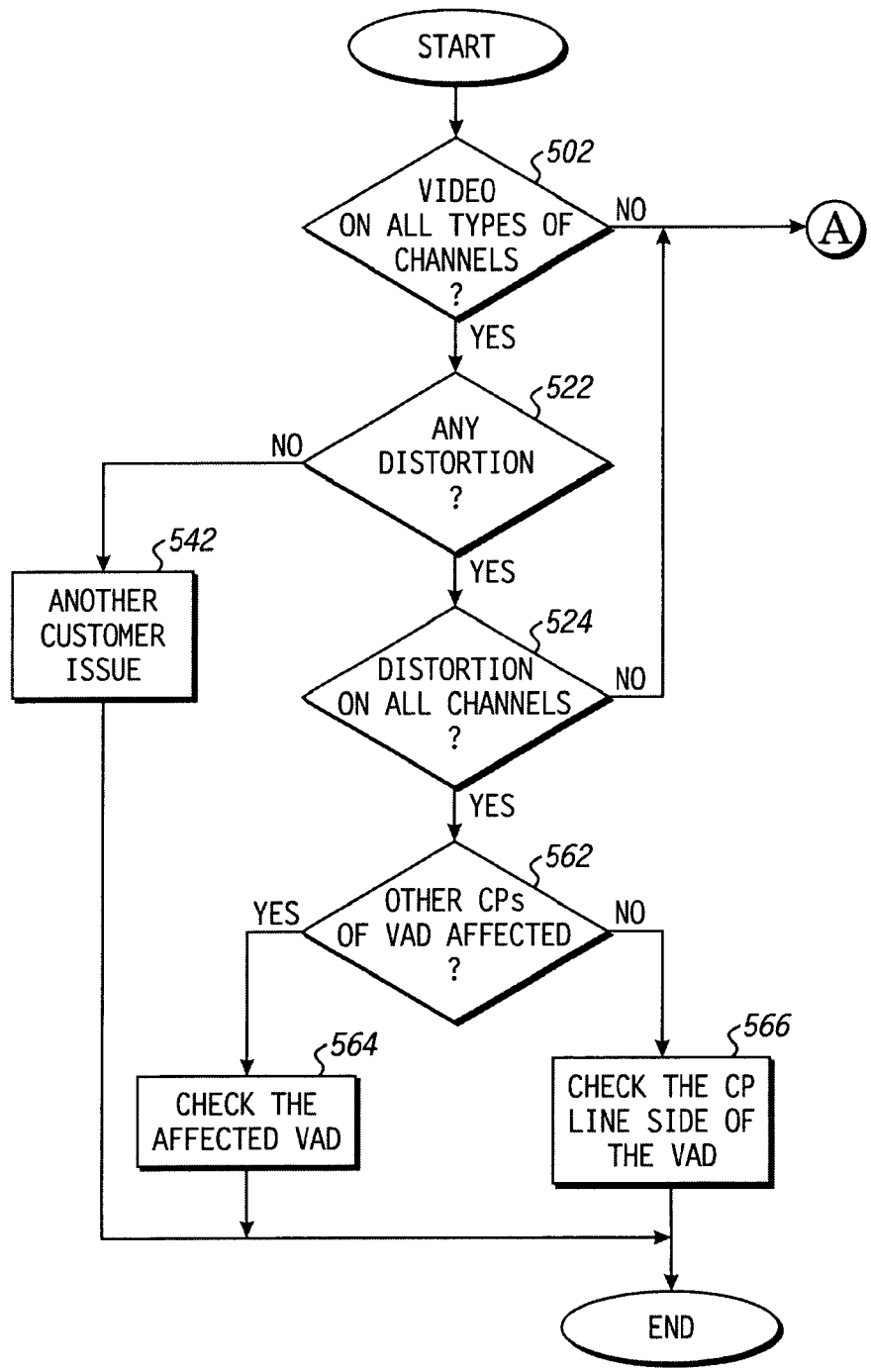
FIGS. 5 and 6 include a flow diagram illustrating a method of diagnosing a video condition experienced at the customer premises.
Figure 6:
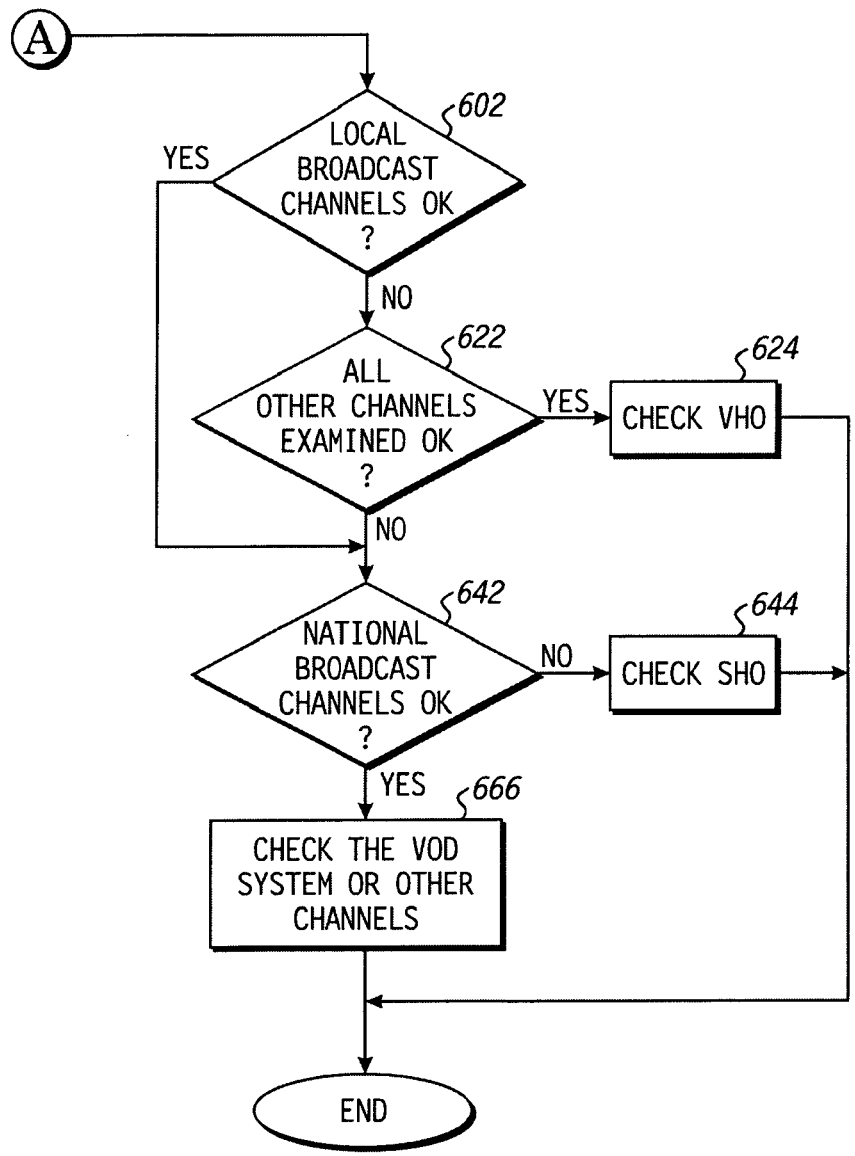

The method can include receiving a notification of a video condition experienced at a CP, such as the CP 462. The notification can be sent to the test controller 402 by the service provider equipment 308 or any of equipment at the CP 462 (see equipment to the left of the dashed line 306 in FIG. 3). In response to receiving the notification, the test controller 402 can activate a diagnosis sequence. The sequence can include sending the set of questions 406 to the CP 462. After receiving the responses from the CP 462, the test controller 402 can isolate the cause of the problem to a portion of the network. FIGS. 5 and 6 are principally directed to the diagnosis sequence.

The method can include determining whether video signals are displayed on different types of channels at the CP, at decision tree 502 in FIG. 5. In one embodiment, a customer may check all channels, in another embodiment, the customer may check one or a few channels within each type of channels, and in a further embodiment, the customer may check some but not all of the types of channels. For example, the customer may test a national broadcast channel, a local broadcast channel, a pay-per-view channel, a channel corresponding to a special subscription package, or any combination thereof. The service provider can determine how extensively, which particular types of channels, or which channel the customer is to check for video signals.

If the CP is displaying video on the different types of channels ("Yes" branch from decision tree 502), the method can also include determining whether there is any distortion, at decision tree 522. Distortion can include choppy movement of people or things as seen in the video image, incorrect color balance, noise (e.g., a grainy image), another visibly perceptible issue with the video image as experienced by the customer, or any combination thereof. If there is no distortion, then a customer issue outside the scope of this specification may be present (see block 542). The test controller 402 may route the customer to a customer care center or other appropriate service center of the service provider operating the network 200. At this point the method for addressing the video condition as experienced by the customer may no longer be handled by the system 400.

If there is distortion ("Yes" branch from decision tree 522), the method can further include whether there is distortion on different types of channels, at decision tree 524 in FIG. 5. The acts performed in making the determination can be any of those previous described with respect to the decision tree 502, except that the determination is made on the basis of distortion rather than the presence or absence of video signals being displayed. The acts used for the decision tree 524 may be the same or different from the acts used for decision tree 502.

If there is distortion on the different types of channels ("Yes" branch from decision tree 524), the method can still further include determining whether other CPs of the V AD are affected, at decision tree 562. In a particular embodiment as illustrated in FIG. 4, the method up to this point may have been directed to a video condition at CP 462. CP 464 may also be experiencing a similar problem. CP 462 and CP 464 are coupled to V AD 262. If another CP is affected ("Yes" branch of decision tree 562), the method can include checking the affected VAD, at block 564 in FIG. 6. The test controller 402 may perform or have activated a test or repair procedure for the V AD 262. Otherwise, a work center for the service provider can be notified of the issue, and a technician may be dispatched to the VAD 262. If another CP is not affected ("No" branch of decision tree 562), the method can include checking the CP line side of the VAD, at block 566 in FIG. 5. The line from the VAD 262 to the NID 304 and corresponding connections can be checked. If the test controller 402 cannot check the line and its corresponding connections, then the work center for the service provider can be notified of the issue, and a technician may be dispatched to address the issue.

If there is not a video signal on any particular channel ("No" branch from decision tree 502 in FIG. 5) or if there is no distortion on any particular channel ("No" branch from decision tree 524), the method can continue with the flow in FIG. 6 to more particularly isolate the portion of the network where the cause of the problem resides.

The method can include determining the local broadcast channel(s) examined are okay, at decision tree 602. For any channel addressed herein, the channel is okay if the video signals are received by the channel without any perceptible distortion (i.e., as perceived by the customer or another human). Otherwise, the channel is not okay.

If the local broadcast channels are not okay ("No" branch of decision tree 602), the method can include determining whether all other channels examined are okay, at decision tree 622. The other channels examined may include the channels examined when performing the determination at decision tree 502 (in FIG. 5), 504, or both.

If all other channels examined are okay ("Yes" branch of decision tree 622 in FIG. 6), the method can include checking the VHO, at block 624 in FIG. 6. The test controller 402 may check the equipment at the VHO 226 or the connections between the local broadcasters and equipment within the VHO 226. In a non-limiting embodiment, a multiplexer or other switching equipment may not be working or otherwise providing a proper connection to equipment at the IO 242 (in FIG. 2) or the CO 244 (in FIG. 4). Alternatively, the test controller 402 may provide a notification to a work center that a problem at the VHO 226 has been detected and further investigation may be needed If the local broadcast channel(s) examined are okay ("No" branch of decision tree 602) or at least one other channel is not okay ("No" branch of decision tree 622), the method can include determining whether the national broadcast channel (s) examined are okay, at decision tree 642. If the national broadcast channel(s) examined are not okay ("No" branch of decision tree 642), the method can include checking the SHO, at block 644 in FIG. 6. The test controller 402 may check the equipment at the SHO 220 or the connections between the national broadcasters and equipment within the SHO 220. In a non-limiting embodiment, a multiplexer or other switching equipment may not be working or otherwise providing a proper connection to equipment at the VHO 246. Alternatively, the test controller 402 may provide a notification to a work center that a problem at the SHO 220 has been detected and further investigation may be needed.

If the national broadcast channels examined are okay ("Yes" branch of decision tree 642 in FIG. 6), the method can include checking the VOD system or another channel, at block 666 in FIG. 6. The test controller 402 may check the VOD system, such as a VOD server, a VOD database or the connections between the VOD system and the network 200, or the like. In a non-limiting embodiment, a multiplexer or other switching equipment may not be working or otherwise providing a proper connection between the VOD system and another part of the network. Similar or different actions may be taken if a different channel, and not the VOD system, is affected. Alternatively, the test controller 402 may provide a notification to a work center that a problem with the VOD system or the different channel has been detected and further investigation may be needed.

In another embodiment, the methodology described above may be performed by a technician dispatched to the customer premises. The technician may connect the service provider equipment 308 in FIG. 3 to the NID 304 that is located outside the building. The service provider equipment 308 may be similar to or different from the CPE (equipment to the left of the dashed line 306). If the problem continues to exist but does not occur with the service provider equipment 308, the problem likely has a cause that is located within the building and can include the CPE, connections between the CPE and the NID 304, or any combination thereof.

In other embodiments, additional or different activities can be performed. For example, the method can include correlating channels with problems to a database having customer information. The cause of the problem could be that the customer is attempting to access a channel not within the customer's current subscription plan. Alternatively, a decision tree for different types of channels can be included, such as a pay-per-view channel, a premium service channel, another channel, or any combination thereof. After reading this specification, skilled artisans will appreciate that the method and system can be tailored to the specific needs or desires of a particular service provider.

The system and (e.g., the test controller 402, the equipment at the SHO 220, VHO 226, IO 242, CO 244, V AD 262, etc.) described herein can be implemented using a general computing system, and the methods described can be carried out by the general computing system that may be located within the network.

Figure 7:
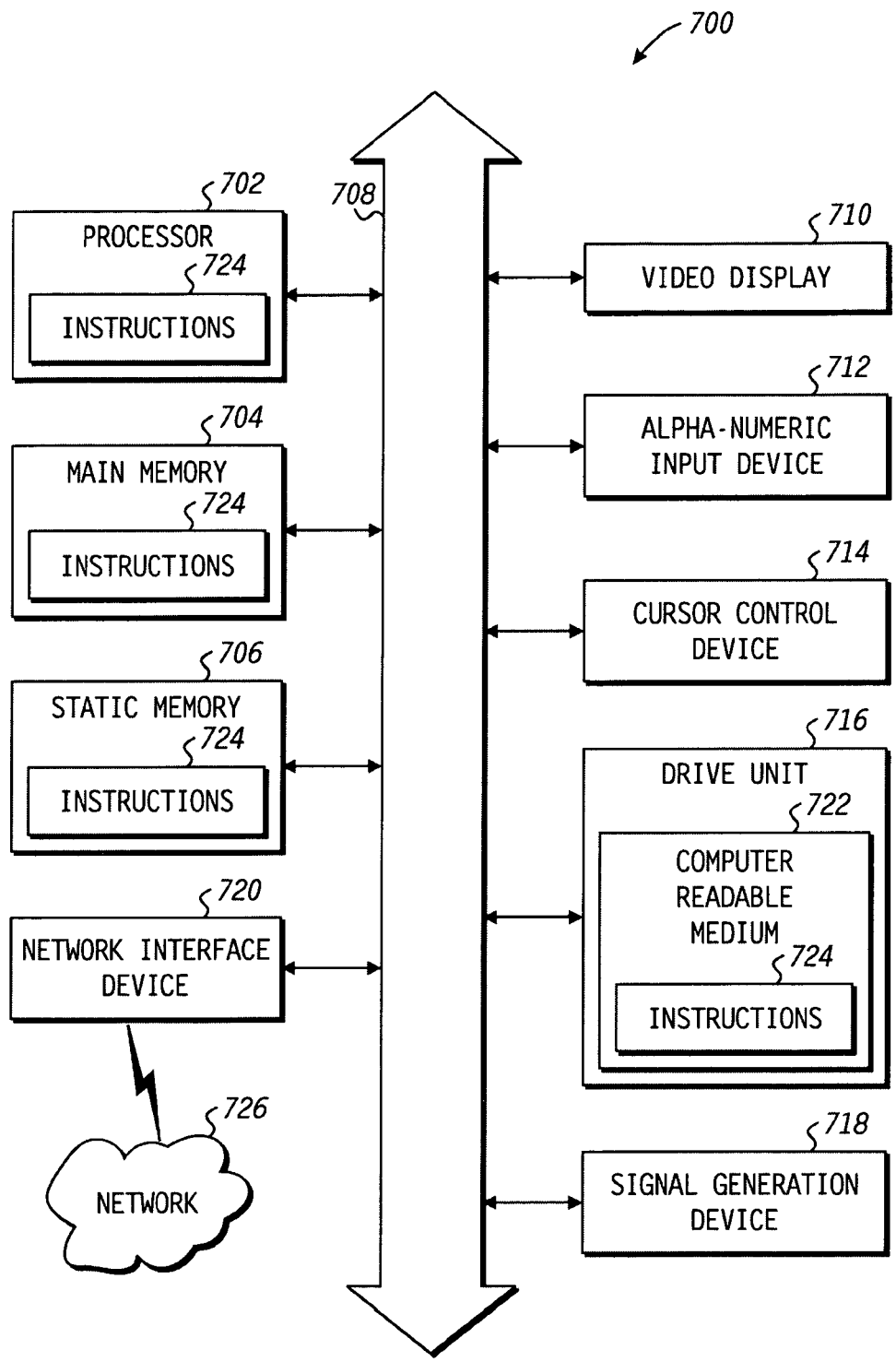
FIG. 7 includes a block diagram of an illustrative embodiment of a general computer system.

FIG. 7 includes an illustrative embodiment of a general computer system 700. The computer system 700 can include a set of instructions that can be executed to cause the computer system 700 to perform anyone or more of the methods or computer based functions disclosed herein. The computer system 700 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a desktop PC, a laptop PC, an STB, a personal digital assistant ("PDA"), a mobile device, a palmtop computer, a laptop computer, a desktop computer, a communications device, a wireless telephone, a wireline telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit ("CPU"), a graphics processing unit ("GPU"), or both. Moreover, the computer system 700 can include a main memory 704 and a static memory 706 that can communicate with each other via a bus 708. As shown, the computer system 700 may further include a video display unit 710, such as a liquid crystal display ("LCD"), an organic light emitting diode ("OLED"), a flat panel display, a solid state display, or a cathode ray tube ("CRT"). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720 to communicate with a network 726. In a particular embodiment, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

Embodiments described herein can be used to allow diagnosis of a video condition to be performed at a CP. In an embodiment, a customer may notice a video condition at the CP. The customer can notify the service provider, which in turn can activate a diagnosis sequence with the test controller 402. The customer can be prompted for input using a set of questions, and the customer can provide answers or other input to the questions. The customer can stay within his or her building and provide the input requested. The customer does not need to visit an office of the service provider or make an appointment to meet with a technician at the CP. Also, the information collected can be in a format that can be more readily used by the computer system or employee of the service provider. Thus, the video condition experienced by the customer may be more quickly addressed and resolved because the location of the cause of the video condition may be isolated more quickly.

Additionally, the customer's input at the time the video condition occurs may address more effectively intermittent or difficult to replicate video conditions. When the video condition occurs intermittently or is difficult to replicate, the method can allow for a more real time diagnosis of the video condition. Thus, customer frustration due to a service provider's inability to diagnose the video condition at a later time because the video condition occurs intermittently or is difficult to replicate may be obviated.

If a customer does not to use the method or if the service provider wants to check a particular CP to ensure repairs have been performed, a technician can be dispatched to the CP. The technician can attach the service provider equipment 308 to the NID 304 to perform the actions that could otherwise be performed by the customer. The technician may use other service provider equipment or perform other tests when at the NID 304. In this manner, the technician does not need to enter a building on the CP, and therefore, an appointment with the customer is not needed.

Many different aspects and embodiments are possible. Some of those aspects and embodiments are described below. After reading this specification, skilled artisans will appreciate that those aspects and embodiments are only illustrative and do not limit the scope of the present invention.

In a first aspect, a test controller can be operable to a video condition experienced at a customer premises. The test controller can include a port and a processor. The port can be coupled to the customer premises. The processor can be operable to activate a diagnosis sequence, send a set of questions to equipment at the customer premises, and isolate a cause of the video condition to a portion of the network in response to receiving responses from the customer premises to the set of questions.

In an embodiment of the first aspect, activate the diagnosis sequence is configured to be performed in response to receiving the notification of the video condition at the customer premises. In another embodiment, the set of questions include which types of channels have problems with video. In a particular embodiment, isolate the cause includes, when the type of channels affected is national broadcast channels, the portion of the network includes transmission equipment used to transmit the national broadcast channels to the customer premises, when the type of channels affected is local broadcast channels, the portion of the network includes transmission equipment used to transmit the national broadcast channels to the customer premises, and when no channels are affected, the portion of the network includes a video-on-demand system. In another particular embodiment, the set of questions includes which types of channels at the customer premises are not displaying video signals. In still another particular embodiment, the set of questions includes which types of channels at the customer premises are displaying distorted video signals. In a further embodiment, the video condition is related to a packetized video broadcast stream.

In a second aspect, a system can be operable to diagnose a video condition experienced at a first customer premises. The system can include a first network interface device at a first customer premises, a video access device coupled to the first network interface device, and a test controller that is coupled to the video access device. The test controller can be operable to activate a diagnosis sequence, send a set of questions to the first customer premises, and isolate a cause of the video condition to a portion of the network in response to receiving responses from the first customer premises to the set of questions.

In an embodiment of the second aspect, the customer premises includes a building and equipment within the building, and the network interface device at the first customer premises, wherein the network interface device lies along a transmission path between the video access device and the equipment. In another embodiment, the system further includes equipment that is coupled to the network interface device and is not disposed within a structure at the customer premises, wherein the network interface device lies along a transmission path between the video access device and the equipment.

In still another embodiment of the second aspect, the video condition is related to a packetized video broadcast stream. In a particular embodiment, the system further includes a broadcast channel multiplexer and a local channel multiplexer, wherein the video access device is coupled to each of the broadcast channel multiplexer and the local channel multiplexer. In a more particular embodiment, the system further includes a video-on-demand server coupled to the video access device.

In a further embodiment of the second aspect, the system further includes a first network interface device at the first customer premises, and a second network interface device at a second customer premises. The video access device can be coupled to the first and second network interface devices. The test controller can be further operable to send another set of questions to the second customer premises, and isolate a cause of the video condition to the video access device or the first customer premises in response to receiving responses from the second customer premises to the other set of questions.

In a third aspect, a method of diagnosing a video condition experienced at a first customer premises can include receiving notification of a video condition experienced at the first customer premises based on video content transmitted over a network, and sending a set of questions to equipment at the first customer premises. The method can also include receiving responses from the first customer premises to the set of questions, and isolating a cause of the video condition to a portion of the network.

In an embodiment of the third aspect, activating the diagnosis sequence is performed in response to receiving the notification of the video condition at the first customer premises. In another embodiment, the set of questions include which types of channels have problems with video. In a particular embodiment, isolating the cause includes, when the type of channels affected is national broadcast channels, the portion of when the type of channels affected is national broadcast channels, the portion of the network includes transmission equipment used to transmit the national broadcast channels to the first customer premises, when the type of channels affected is local broadcast channels, the portion of the network includes transmission equipment used to transmit the national broadcast channels to the first customer premises, and when no channels are affected, the portion of the network includes a video-on-demand system. In another particular embodiment, the set of questions includes which types of channels at the first customer premises are not displaying video signals. In a further particular embodiment, the set of questions includes which types of channels at the first customer premises are displaying distorted video signals.

In still another embodiment of the third aspect, receiving the responses includes receiving the responses from equipment within a building at the first customer premises. In yet another embodiment, receiving the responses includes receiving the responses from equipment coupled to the network, and the equipment is at the first customer premises and not disposed within a building at the first customer premises. In a further embodiment, the method further includes sending another set of questions to a second customer premises, and receiving responses from the second customer premises to the other set of questions, wherein isolating the cause including isolating the cause of the video condition to the video access device or the first customer premises in response to receiving responses from the second customer premises to the other set of questions. In still a further embodiment, the video condition is related to a packetized video broadcast stream.

A processor readable medium can include code. The code can include instructions for a processor to carry out any part or all of the methods described herein.

Note that not all of the activities described above in the general description or the examples are required, that a portion of a specific activity may not be required, and that one or more further activities may be performed in addition to those described. Still further, the order in which activities are listed are not necessarily the order in which they are performed.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The abstract of the Disclosure is provided with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
    sending, by a system including a processor, a first query to first equipment at a first customer premises;
    receiving, by the system, first responses to the first query from the first equipment at the first customer premises;
    sending, by the system, a second query to second equipment at a second customer premises;
    receiving, by the system, second responses to the second query from the second equipment at the second customer premises; and
    isolating a cause of a video condition at the first customer premises in response to receiving the second responses.

2. The method of claim 1, wherein the first query comprises requesting information to enable identification of channels at the first customer premises that are not displaying video signals.

3. The method of claim 1, wherein the first query comprises requesting information to enable identification of channels at the first customer premises that are displaying distorted video signals.

4. The method of claim 1, wherein the first query is associated with a channel not displaying video content.

5. The method of claim 1, further comprising:
    receiving, by the system, a notification associated with the video condition at the first customer premises; and
    identifying, by the system, the video condition based on the notification.

6. The method of claim 1, further comprising correlating channels with problems to a database having customer information, wherein the video condition is associated with video content transmitted over a network.

7. The method of claim 1, wherein the first query comprises requesting information to detect channels at the first customer premises that are experiencing the video condition.

8. The method of claim 1, wherein the first equipment is located within a building at the first customer premises.

9. The method of claim 1, wherein the video condition is related to a packetized video broadcast stream.

10. A computer-readable storage device comprising computer instructions, which responsive to being executed by a processor at a first customer premises, cause the processor to perform operations comprising:
    receiving a first query associated with a video condition experienced at the first customer premises; and
    providing first responses to the first query to a server thereby enabling the server to obtain second responses to a second query provided to second equipment at a second customer premises,
    wherein a cause of the video condition is isolated to a portion of a network based on the second responses.

11. The computer-readable storage device of claim 10, wherein the operations further comprise:
    when channels affected are national broadcast channels, the portion of the network is identified as transmission equipment used to transmit the national broadcast channels to the first customer premises;
    when the channels affected are local broadcast channels, the portion of the network is identified as transmission equipment used to transmit the national broadcast channels to the customer premises; and
    when the local broadcast channels and the national broadcast channels are not affected, the portion of the network is identified as a video-on-demand system.

12. The computer-readable storage device of claim 10, wherein the operations further comprise providing a notification of the video condition to the server.

13. The computer-readable storage device of claim 12, wherein the providing of the notification to the server causes the server to provide the first query to the processor.

14. The computer-readable storage device of claim 10, wherein the first query comprises requesting information to enable detecting channels experiencing the video condition.

15. The computer-readable storage device of claim 10, wherein the first query comprises requesting information to enable identification of channels that are not displaying video signals.

16. The computer-readable storage device of claim 10, wherein the first query comprises requesting information to enable identification of channels that are displaying distorted video signals.

17. A system comprising:
- a port coupled with first and second customer premises over a network;
- a memory to store computer instructions; and
- a controller which executes the computer instructions to perform operations comprising:
    - obtaining a notification associated with a video condition at the first customer premises;
    - sending a first query to first equipment at the first customer premises;
    - receiving first responses to the first query from the first equipment;
    - sending a second query to second equipment at a second customer premises;
    - receiving second responses to the second query from the second equipment; and
    - isolating a cause of a video condition at the first customer premises in response to receiving the second responses.

18. The system of claim 17, wherein the isolating of the cause of the video condition comprises isolating a portion of the network and further comprising:
- when channels affected are national broadcast channels, the portion of the network is identified as transmission equipment used to transmit the national broadcast channels to the first customer premises;
- when the channels affected are local broadcast channels, the portion of the network is identified as transmission equipment used to transmit the national broadcast channels to the customer premises; and
- when the local broadcast channels and the national broadcast channels are not affected, the portion of the network is identified as a video-on-demand system.

19. The system of claim 17, wherein the first equipment is not located within a building at the first customer premises.

20. The system of claim 17, wherein the first query comprises identifying channels at the first customer premises that are not displaying video signals.

* * * * *